United States Patent [19]

Nasrallah

[11] 4,377,484

[45] Mar. 22, 1983

[54] METHOD OF CHELATING HEAVY METAL IONS

[76] Inventor: Elias T. Nasrallah, 12359 Falaise Dr., Creve Coeur, Mo. 63141

[21] Appl. No.: 110,402

[22] Filed: Jan. 8, 1980

[51] Int. Cl.$^3$ .............................................. C02F 5/10
[52] U.S. Cl. ................................... 210/698; 252/180
[58] Field of Search .................. 210/54, 58, 698, 914; 252/180, 181; 260/429 J, 431, 435 R

[56] References Cited

U.S. PATENT DOCUMENTS 3,592,764  7/1971  Tate .................................... 210/58
3,658,710  4/1972  Puckorius ........................... 210/58

OTHER PUBLICATIONS

Chemical Abstracts, vol. 92, 129574u, 1980.
Chemical Abstracts, vol. 84, 165340h, 1976.
Chemical Abstracts, vol. 86, 140,642m, 1977.

Primary Examiner—Peter A. Hruskoci
Attorney, Agent, or Firm—Senniger, Powers, Leavitt and Roedel

[57] ABSTRACT

Poly(2-vinyl pyridine-1-oxide), a nontoxic water-soluble polymer, is useful for chelating heavy metal ions, such as mercury and lead, found as a result of poisoning or environmental contamination. The polymer forms stable metal-chelate complexes and is effective over a wide range of pH values.

4 Claims, 7 Drawing Figures

CONDUCTIVITY OF A) 40 mls OF 0.45% $HgCl_2$ VS mls OF PVPO AQUEOUS SOLUTION ADDED.
B) 40 mls OF 0.45% $HgCl_2$ OF $H_2O$ ADDED.

CONDUCTIVITY OF A) 40 m/s OF 0.45% $HgCl_2$ VS m/s OF $P_2VPO$ AQUEOUS SOLUTION ADDED.
B) 40 m/s OF 0.45% $HgCl_2$ OF $H_2O$ ADDED.

UV SPECTRA OF 0.4% P₂VPO
a) IN H₂O  b) IN 0.1% HgCl₂  c) IN 0.4% HgCl₂  d) IN 0.8% HgCl₂

$\eta_{sp}/c$ vs. C of $P_2VPO$. Starting with 0.8% $P_2VPO$
A) Polymer was diluted with $H_2O$
B) Polymer was diluted with 0.45% $HgCl_2$ EFFECT OF TEMPERATURE CHANGE ON THE VISCOSITY OF $P_2VPO$ - $HgCl_2$ CHELATE SOLUTION. A) 0.4% $P_2VPO$ IN $H_2O$. B) 0.4% $P_2VPO$ IN 0.45% $HgCl_2$.

1

METHOD OF CHELATING HEAVY METAL IONS

BACKGROUND OF THE INVENTION

This invention relates to chelating agents and, more particularly, to chelating agents for heavy metal ions such as mercury and improved methods for chelating such ions.

As is known, dimercaprol (2,3-dimercapto-1-propanol) is used as a detoxifying agent or chelating or complexing agent in mercury poisoning and against the toxicity of other heavy metal ions. However, dimercaprol suffers from a number of disadvantages and shortcomings. Thus, dimercaprol is not useful for iron, cadmium or selenium poisoning because the resulting Dimercaprol-metal complex is more toxic than the metal itself, especially to the kidney. Moreover, dimercaprol is not water-soluble and can be used only as a dispersion in peanut oil. Also, dimercaprol-metal complexes break down easily in an acid medium and therefore production of an alkaline urine is desired to afford protection to the kidney during dimercaprol therapy.

There is a need, therefore, for improved chelating or complexing agents for heavy metal ions which do not suffer from these drawbacks. There is also a need for such improved agents which are useful in removing heavy metal ions (e.g., mercury) from aqueous systems such as industrial discharges or waste waters.

SUMMARY OF THE INVENTION

Among the several objects of the invention may be noted the provision of an improved method for chelating heavy metal ions; the provision of such a method which utilizes a nontoxic chelating agent; the provision of such a method in which the chelating or complexing agent is water-soluble; the provision of a method of the type described in which the resulting chelating agent-metal complexes are stable in acid medium down to a pH of 2; and the provision of such a method in which the chelating agent employed is stable in aqueous medium at different pH values. Other objects and features will be in part apparent and in part pointed out hereinafter.

Briefly, therefore, the present invention is directed to a method of chelating a heavy metal ion or ions which comprises contacting a substance containing the ion or ions with an aqueous solution of poly(2-vinyl pyridine-1-oxide).

DESCRIPTION OF THE PREFERRED EMBODIMENTS

Figure 1:
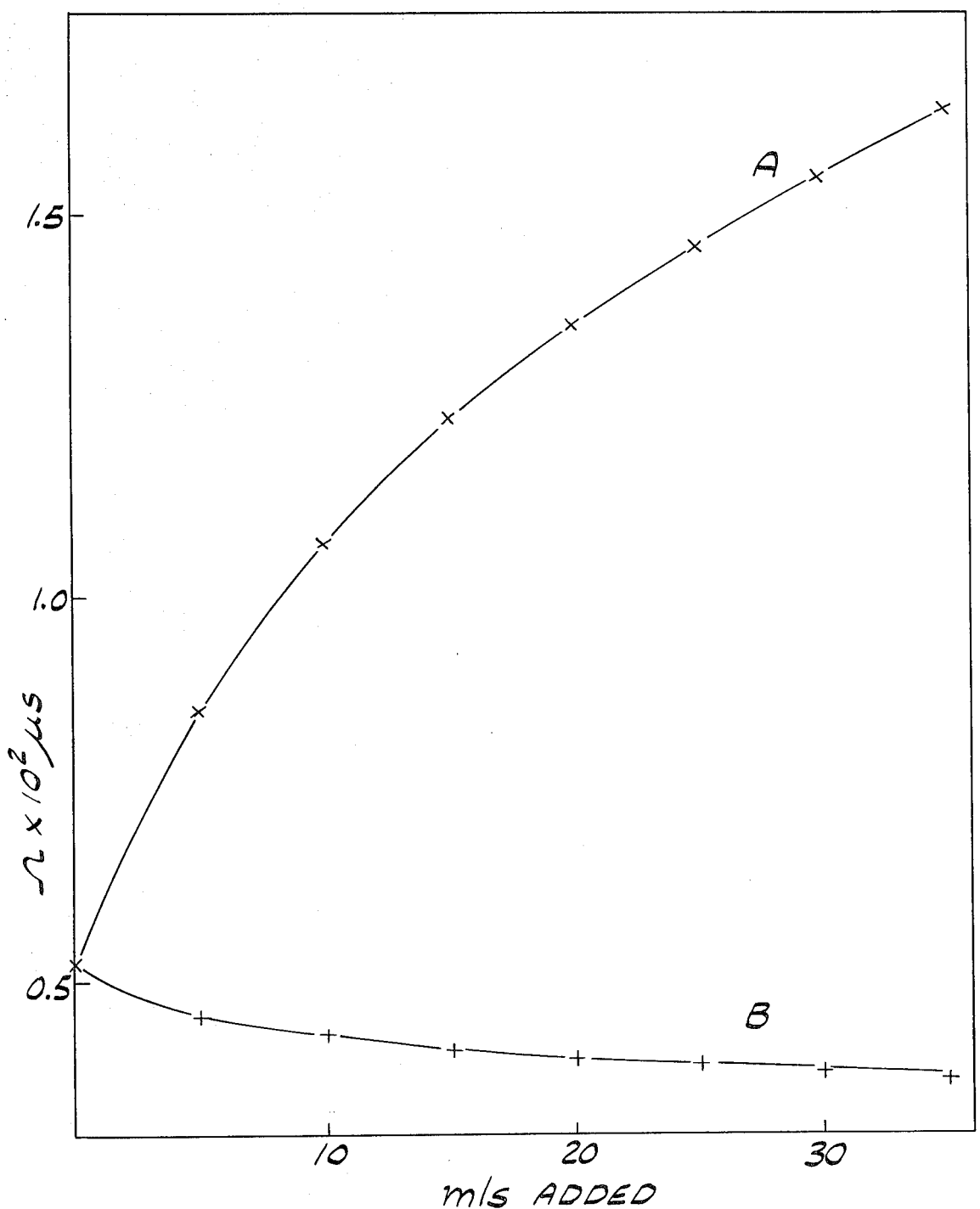
FIG. 1 is a plot of the conductivity of mercuric chloride solutions and mixtures of aqueous solutions of mercuric chloride and poly(2-vinyl pyridine-1-oxide)

In accordance with the present invention, it has now been found that poly(2-vinyl pyridine-1-oxide) is a good chelating agent for heavy metal ions including toxic heavy metal ions such as mercury and lead. Poly(2-vinyl pyridine-1-oxide) is a known polymer which has been found to inhibit the fibrogenic effect of silica in animals (Schlipkoter et al., A. Dtsch. Med. Wodenschr. 1960, 85, 920). It is nontoxic (Grundmann, E. (1967). Experimentelle Untersuchungen über die Zellulare Speicherung des Polyvinyl pyridine N-oxids. In Fortschritte der Staublungenforschung, Vol. 2, pp. 223–229; and Schmäl, D. (1969). Prüfung von Polyvinyl pyridine-N-oxid auf die carcinogene Wirkung bei Ratten and Mäusen. Arzneimittel-Forsche, 19, 1313–1314) and is readily soluble in water. I have found that dilute aqueous solutions of this polymer (down to 0.03% by weight) are useful for chelating minute quantities of heavy metal ions such as mercury and that the resulting polymer-metal complexes are soluble and quite stable. Also, in contrast to dimercaprol, such complexes are stable in acid medium down to a pH of 2. Further, in the case of mercury, I have found that poly(2-vinyl pyridine-1-oxide) has a greater affinity for mercuric ions than for calcium ions under the same conditions.

It has heretofore been known that highly coordinated mercuric ions are not very stable and that in general oxygen donors coordinate only weakly with these ions. Pyridine 1-oxide forms hexakis (pyridine 1-oxide) mercury (II) perchlorate (J. Am. Chem. Soc., 1963, 83, 3773 and J. Am. Chem. Soc., 1962, 2, 182) and 4-methylpyridine 1-oxide forms $[Hg(oxide)_2X_4]^{-2}$ ($X=Cl^-$, $Br^-$, $I^-$) (Naturwissenschaften, 1967, 54, 248). However, most pyridine 1-oxide complexes are prepared and isolated from organic solvents such as ethanol or chloroform. While pyridine 1-oxide has been shown to be a good ligand for many metal ions (Coordin. Chem. Rev., 1968, 3, 375), polymeric N-oxide complexes have not been previously known.

As stated, I have found that poly(2-vinyl pyridine-1-oxide) interacts with various heavy metal ions to form stable chelates or complexes. A decrease in the viscosity of a solution of the polymer containing heavy metal ions indicates an interaction or chelating of the metal ions with the polymer. Viscosity studies have been carried out in accordance with the present invention which show that many heavy metal ions including mercury, lead, tin, cadmium, silver, zinc, copper, nickel, cobalt, iron, manganese, chromium, vanadium and titanium all interact or chelate with poly(2-vinyl pyridine-1-oxide). This polymer is useful, therefore, for eliminating the toxic effect of heavy metal ions and for removing such ions from aqueous systems.

The following further illustrates the invention:

Poly(2-vinyl pyridine-1-oxide) was prepared by oxidizing poly 2-vinyl pyridine with hydrogen peroxide in acetic acid in a known manner. The product was purified twice before use by dissolving it in ethanol and precipitating it out with ether. The polymer is a white powder which is very hygroscopic and freely soluble in water.

Various mixtures of aqueous solutions of the polymer and of mercuric chloride were prepared as indicated below. Conductivity measurements were carried out using a CD 6N Taccussel conductometer. The polymer solution was added in portions to the mercuric chloride solution while stirring continuously until a constant reading was obtained after the addition of each portion.

Ultraviolet spectra were recorded for mixtures of the polymer and mercuric chloride solutions which had been allowed to stand for at least one hour after mixing.

Viscosity measurements were carried out at $27 \pm 0.01°$ C. using a suspended level viscometer which has a flow time for water of $102 \pm 0.2$ seconds. The flow time of a solution was taken as the mean of at least two consecutive measurements differing by not more than 0.2 second. This gives rise to an error of 0.002 in the specific viscosity ($\eta SP$) value.

The results are shown in FIGS. 1–7.

Referring to FIG. 1, the change in the conductivity of an aqueous mercuric chloride after the addition of poly(2-vinyl pyridine-1-oxide) ($P_2VPO$) may be observed. The mercuric chloride solution, being a weak electrolyte, conducts electricity to a very small extent but the addition of $P_2VPO$ increased the conductivity significantly. As the concentration of the polymer increased, the conductivity also increased indicating the liberation of chloride ions and chelation of mercuric ions. The addition of 2-methylpyridine-1-oxide instead of $P_2VPO$ to a mercuric chloride solution under the same conditions did not increase the conductivity.

Figure 2:
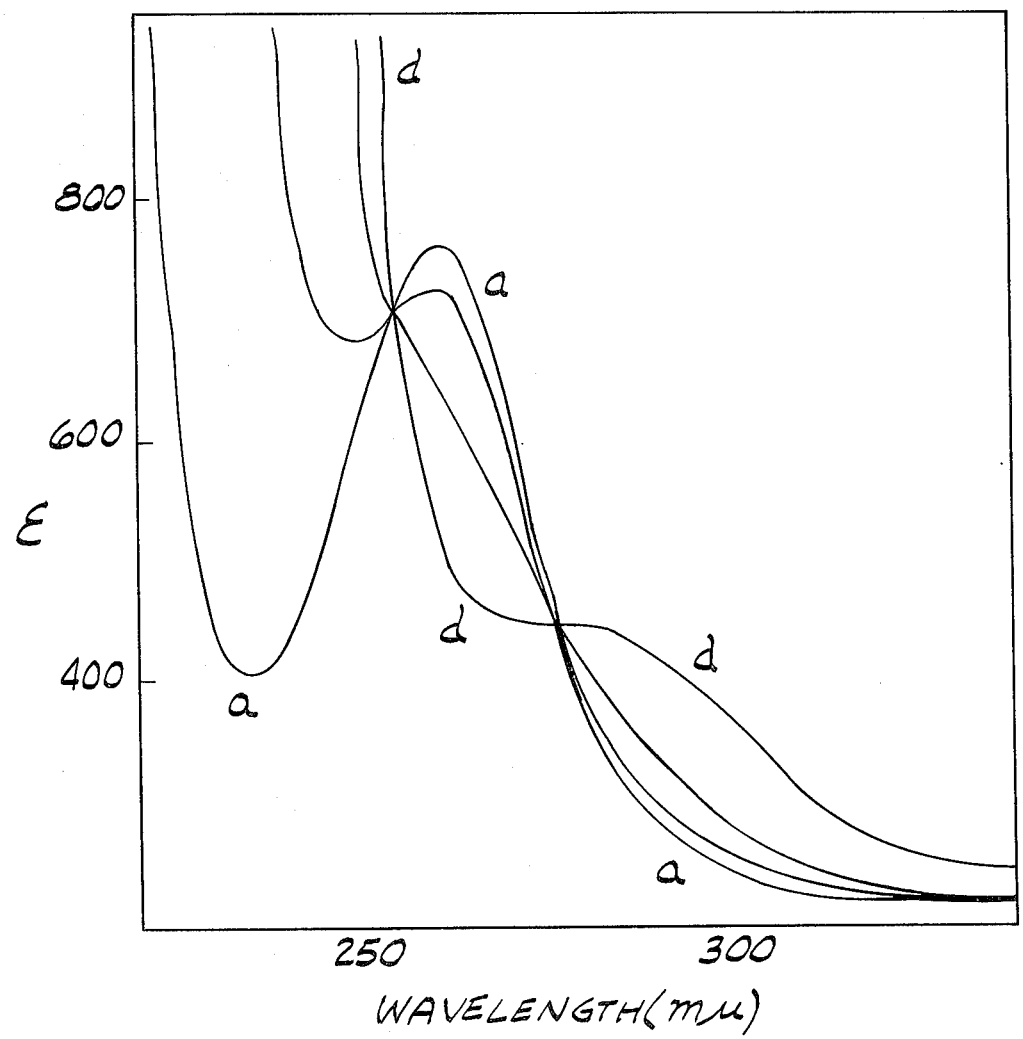
FIG. 2 is a plot of the ultraviolet spectra of poly(2-vinyl pyridine-1-oxide) in water and in various mercuric chloride solutions.
Figure 3:
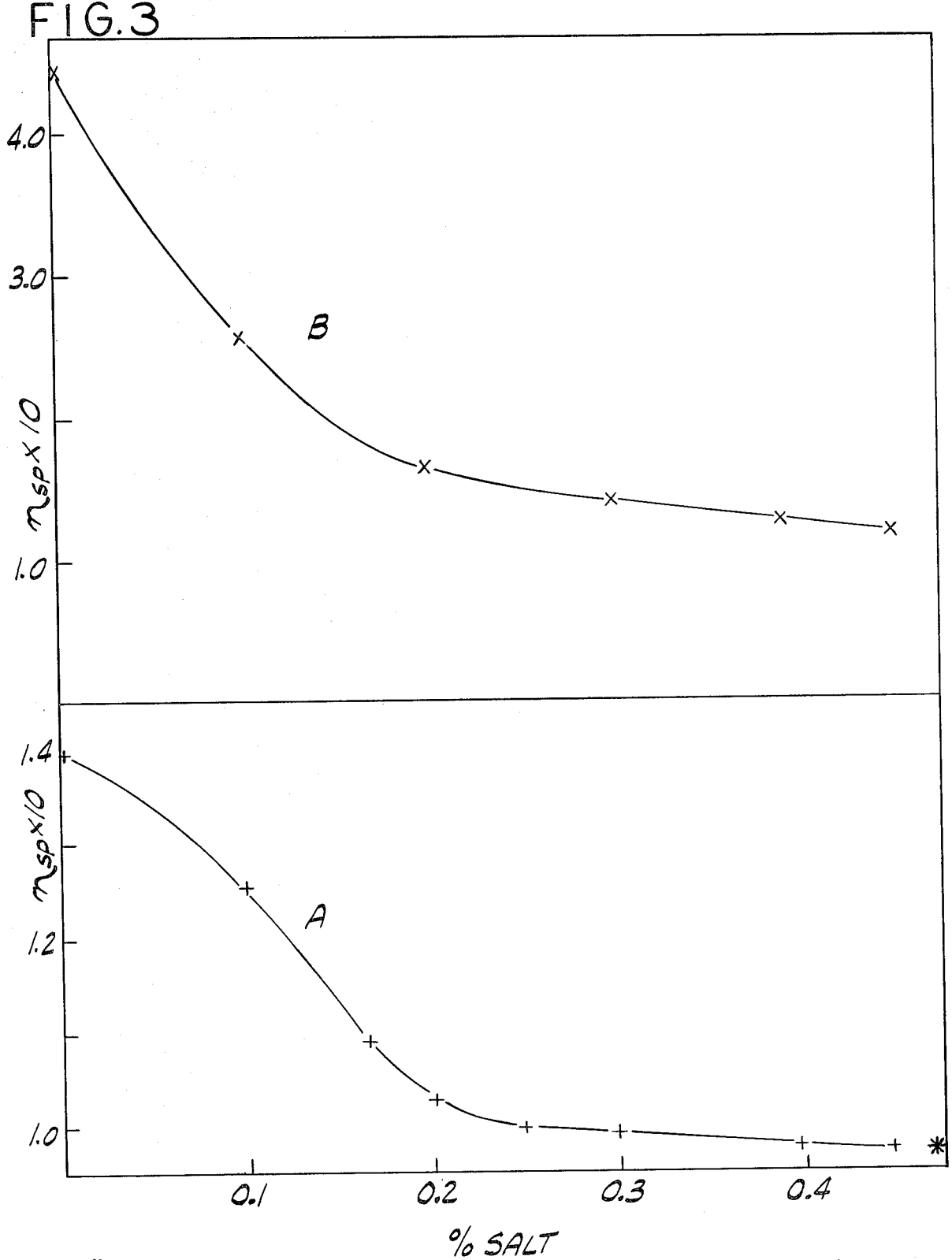
FIGS. 3A and B are plots of the viscosity of solutions of poly(2-vinyl pyridine-1-oxide) and mercuric chloride and of poly(2-vinyl pyridine-1-oxide) and mercuric nitrate, respectively.
Figure 4:
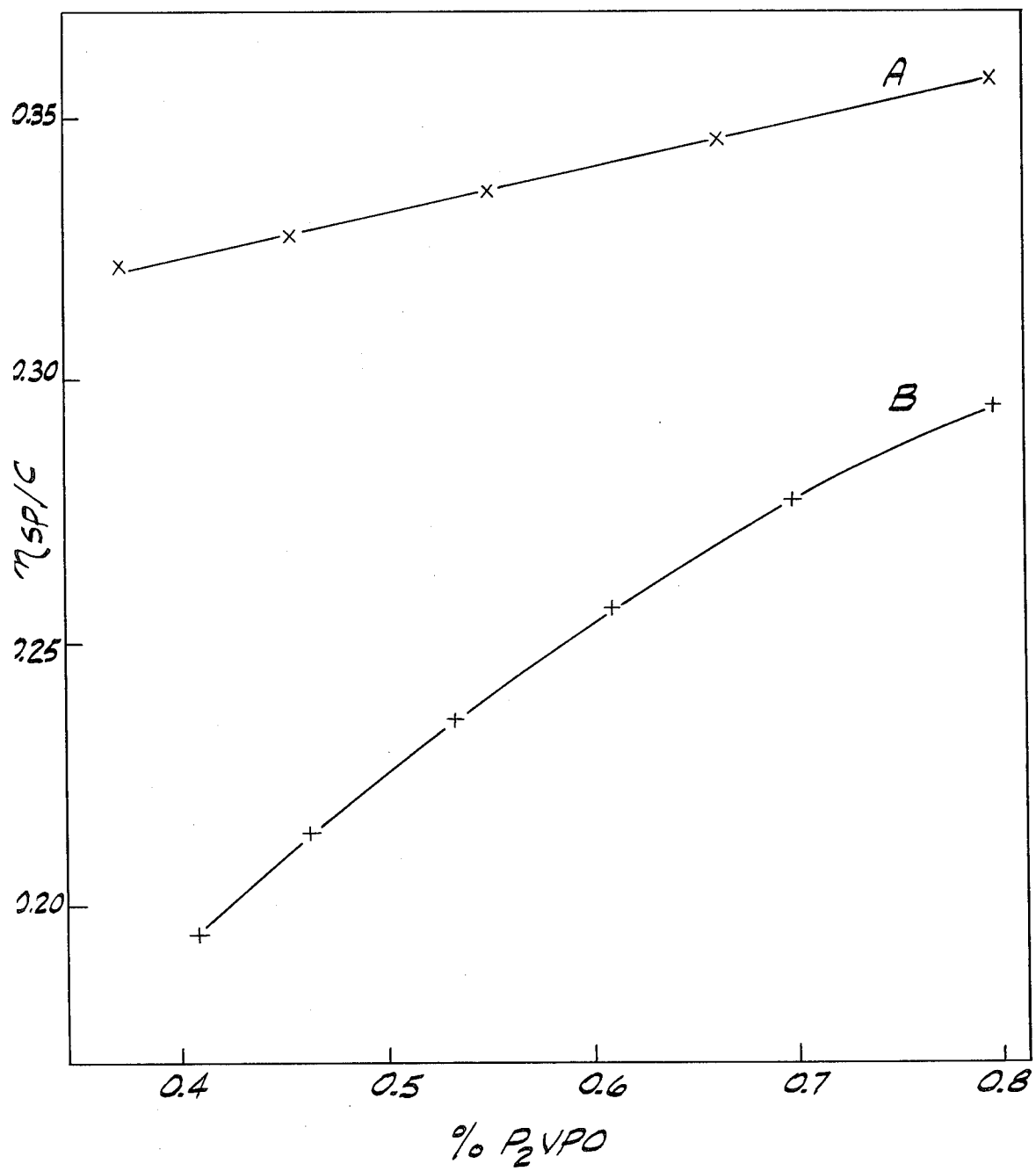
FIG. 4 is a plot of the viscosity of aqueous solutions of poly(2-vinyl pyridine-1-oxide) and of aqueous solutions of poly(2-vinyl pyridine-1-oxide) and mercuric chloride.

The effect of mercuric chloride on the UV spectra of $P_2VPO$ is shown in FIG. 2. $P_2VPO$ solution alone showed a band at 261 m$\mu$ whereas, in the presence of mercuric chloride, the band disappeared and a new less intense band appeared at 280 m$\mu$. At different concentrations of mercuric chloride, the spectra showed two clear isosbestic points indicating an equilibrium between the polymer and its complex form. Mercuric chloride solution had no appreciable effect on the spectra of 2-methylpyridine-1-oxide using the same concentration as that of the polymer and this was in agreement with the conductivity results.

The viscosity of a polymer solution is related to the degree of coiling of the polymer chain and provides information regarding its interaction with a cosolute. The specific viscosity decreases whenever the polymer chain decreases in size or is folded. Therefore, a decrease in the viscosity of the polymer solution containing metal ions is indicative of interaction with the metal ions. In the presence of mercuric chloride, the viscosity of a 0.4% $P_2VPO$ solution decreased rapidly at first and then gradually reached a minimum when the concentration of mercuric chloride was increased up to 0.2% and beyond (FIG. 3A). At higher concentrations of mercuric chloride, the viscosity of the polymer did not decrease appreciably but a white precipitate formed when the concentration reached $16.4 \times 10^{-3}$ M mercuric chloride in $33 \times 10^{-3}$ M/resd. $P_2VPO$, a ratio of 1 to 2, and this conforms with that obtained from the UV spectra.

When the viscosity measurements were repeated using mercuric nitrate at pH 2, the viscosity started high due to an expansion of the protonated polymer chain and then it was reduced in the presence of mercuric nitrate almost to the same value as that observed with mercuric chloride (FIG. 3B). This suggests that the $Hg^{+2}$ replaces the $H^+$ in the protonated polymer.

The viscosity of $P_2VPO$ solution alone conforms to that of a non-electrolyte polymer, since a plot of $\eta sp/C$ against C gave a straight line (FIG. 4), as would be expected from Huggin's equation for a solution of long chain polymer. (J. Phys. Chem., 1938, 42, 911). However, $\eta sp/C$ against C of $P_2VPO$ in the presence of $HgCl_2$ was not linear which indicates that the chelate is a polyelectrolyte.

Figure 5:
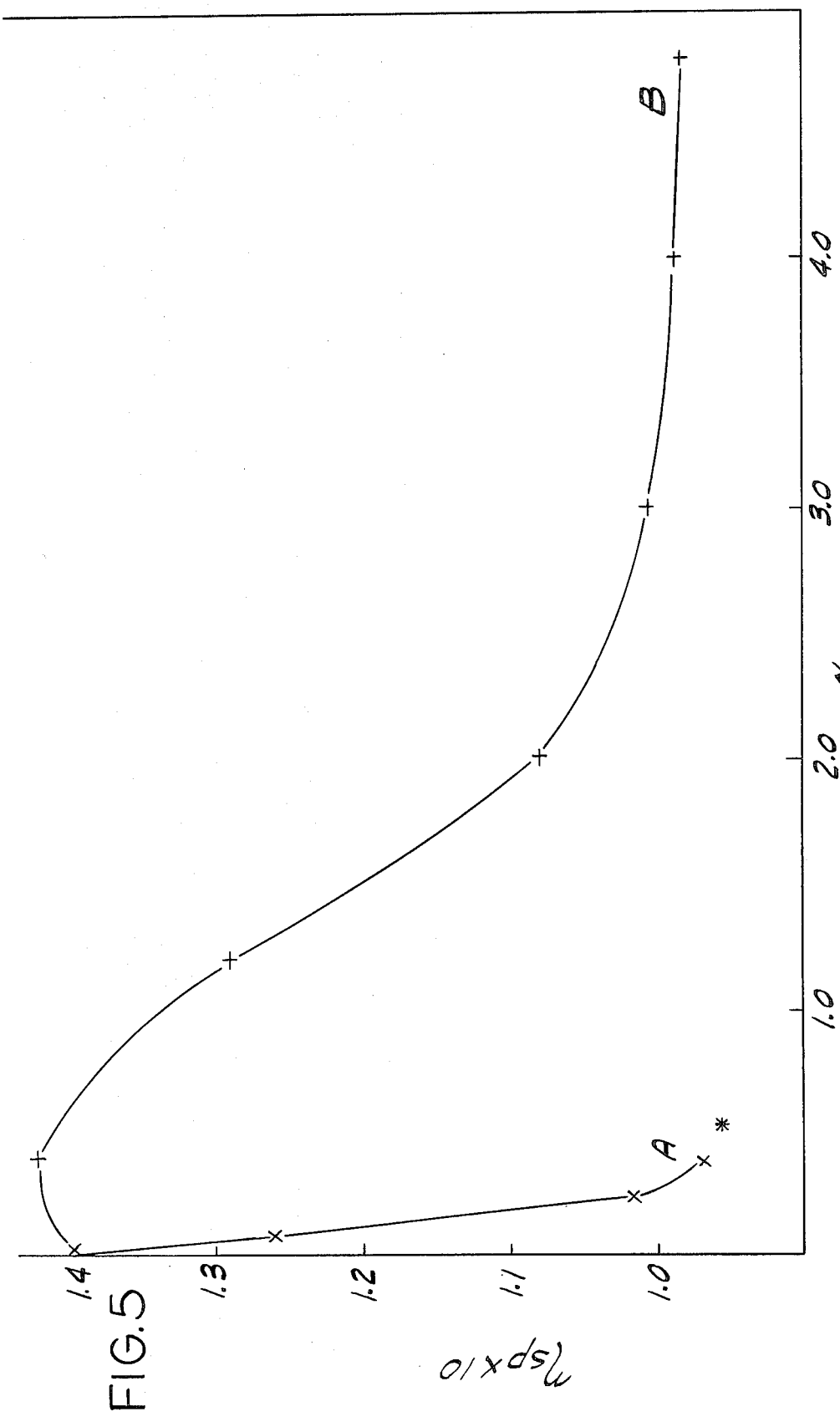
FIG. 5 is a plot of the viscosity of aqueous solutions of poly(2-vinyl pyridine-1-oxide) and mercuric chloride and of poly(2-vinyl pyridine-1-oxide) and calcium chloride, respectively.

The effect of $HgCl_2$ on the viscosity of 0.4% $P_2VPO$ was compared with that of $CaCl_2$ (FIG. 5). The viscosity of the polymer was reduced sharply reaching a minimum in the presence of only 0.2% ($7.3 \times 10^{-3}$ M) $HgCl_2$, but not in the presence of $CaCl_2$ of the same concentration. It was not until 4% (0.24 M) $CaCl_2$, or about fifteen times the concentration of $HgCl_2$, when the viscosity of the polymer reached a minimum, but no precipitation occurred. It was interesting to observe that in the presence of $CaCl_2$ the viscosity of the polymer first increased slightly then it was reduced at higher concentrations of $CaCl_2$.

Figure 6:
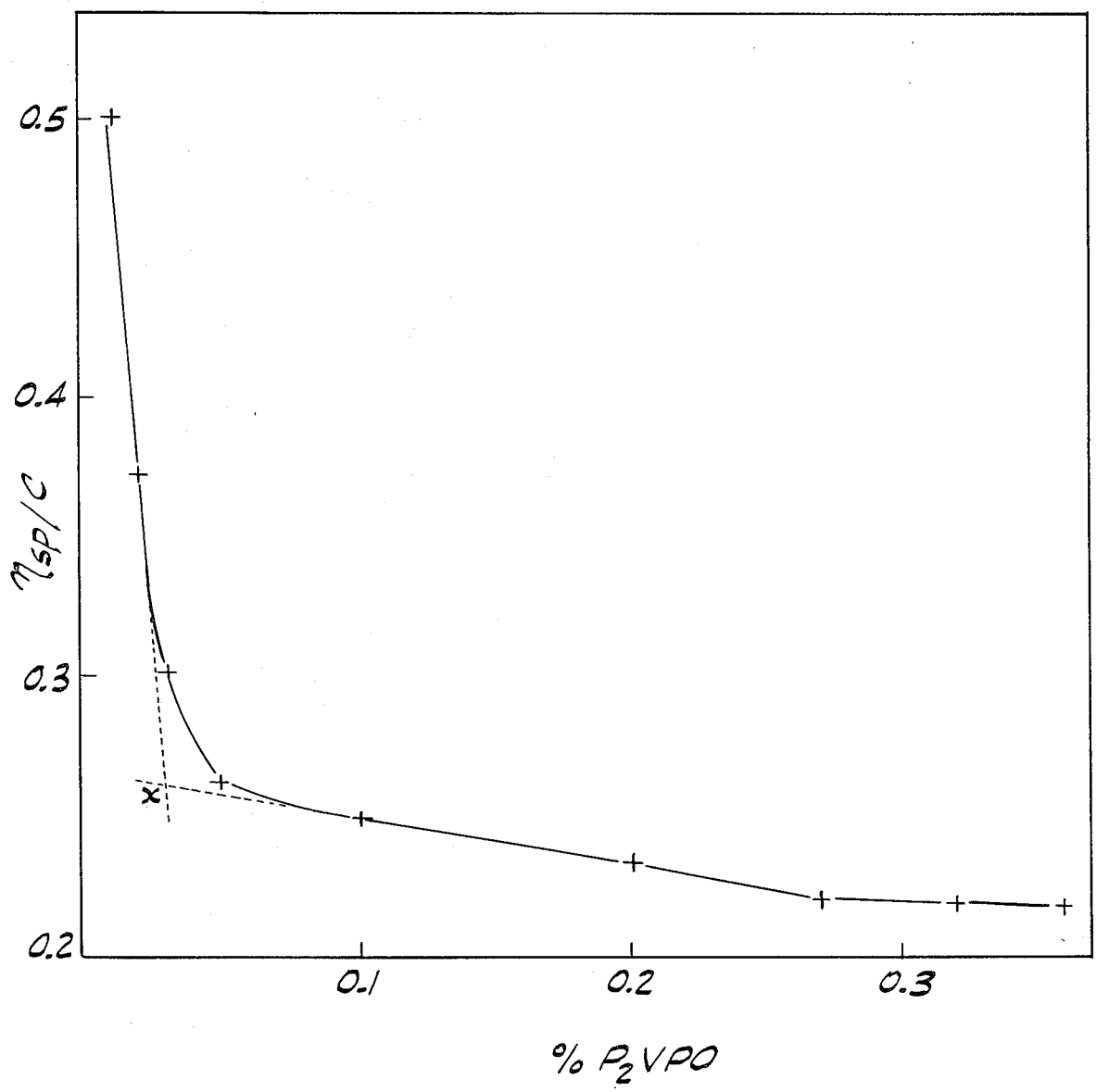
FIG. 6 is a plot of the viscosity of aqueous solutions of poly(2-vinyl pyridine-1-oxide) and mercuric chloride.

The stability of the $P_2VPO$—$HgCl_2$ chelate against dilution was followed up from the change in viscosity ($\eta sp/C$) which is related to the change in conformation of the polymer molecule. Starting with a solution consisting of 0.4% ($33 \times 10^{-3}$ M/resd.) $P_2VPO$ and 0.45% ($16.5 \times 10^{-3}$ M) $HgCl_2$ (a molar ratio of 2 to 1) the change in viscosity against dilution with water is shown in FIG. 6. When the solution was diluted, the viscosity starts to increase only gradually; however at about 0.3% $P_2VPO$ the viscosity increased very sharply. This sharp rise in viscosity suggests that below this concentration the dissociation of the chelate is complete and the polymer retains its normal conformation. If one considers the concentrations of the dissociated and the undissociated species at this sharp turning point, we find that they conform fairly well with those obtained from the UV spectra.

Figure 7:
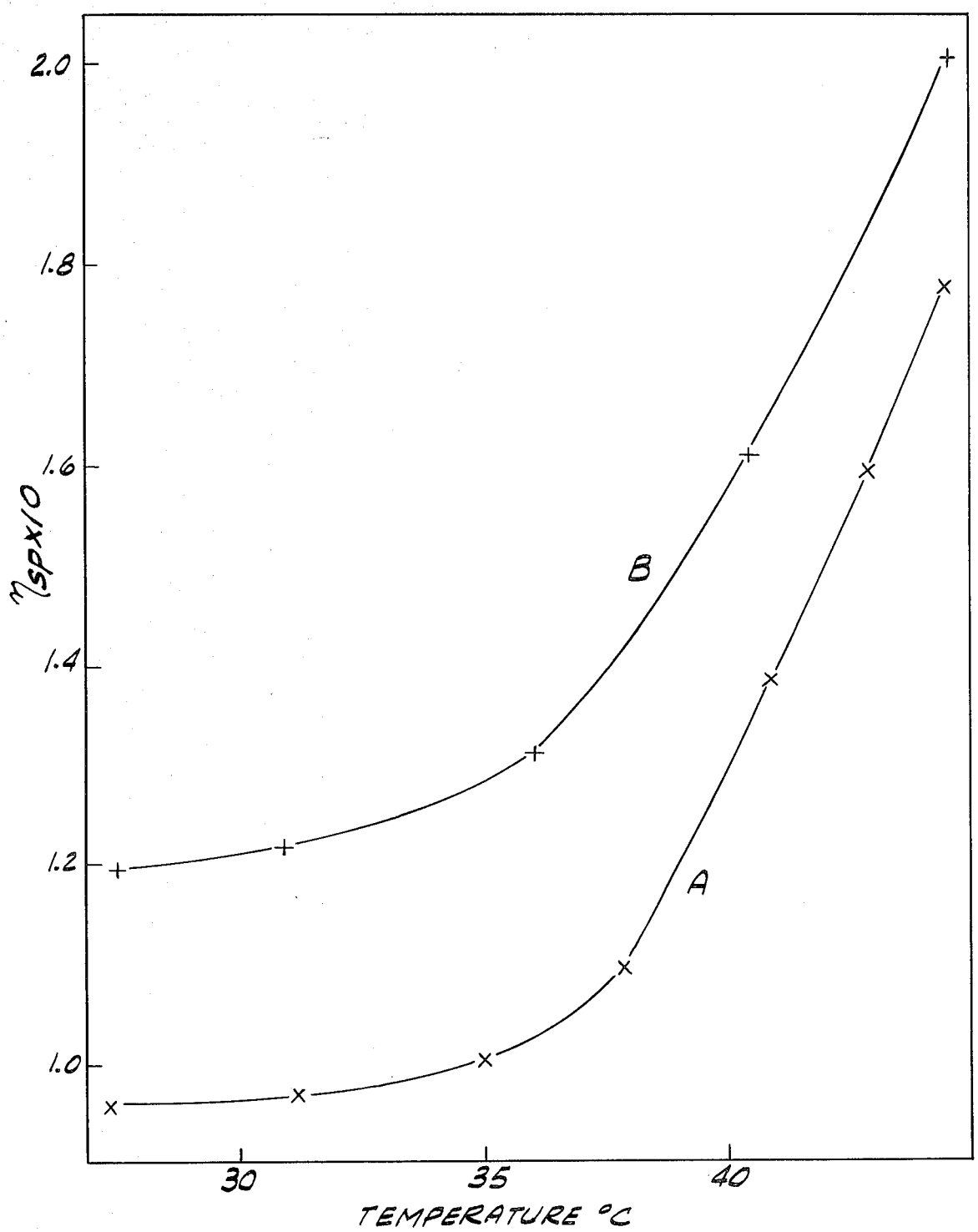
FIG. 7 is a plot of the effect of temperature on the viscosity of aqueous solutions of poly(2-vinyl pyridine-1-oxide) and mercuric chloride.

The effect of temperature change on the stability of the $P_2VPO$—$HgCl_2$ chelate was also investigated by viscosity measurements. FIG. 7 shows that the viscosity of the polymer solution alone increased with temperature. In the presence of $HgCl_2$ the viscosity-temperature curve was lower than that of the polymer alone as would be expected and followed almost the same trend till about 45° C., which shows that the chelate remains fairly stable.

Viscosity measurements were also made of a number of aqueous solutions of $P_2VPO$ and various heavy metal ions. It was found in each instance that the $P_2VPO$ interacted with the heavy metal ion as indicated by a decrease in viscosity. The results are as follows:

| Metal Ion ($8 \times 10^{-3}$M) | $\eta sp/C$ against C for $P_2VPO$ ($33 \times 10^{-3}$M) |
| --- | --- |
| None | 0.320 |
| Ti | 0.216 |
| V | 0.221 |
| Cr | 0.215 |
| Mn | 0.216 |
| Fe | 0.210 |
| Co | 0.185 |
| Ni | 0.213 |
| Cu | 0.175 |
| Zn | 0.210 |
| Ag | 0.168 |
| Cd | 0.215 |
| Sn | 0.221 |

-continued

| Metal Ion<br>($8 \times 10^{-3}$M) | $\eta_{sp}/C$ against C<br>for P$_2$VPO ($33 \times 10^{-3}$M) |
|---|---|
| Pb | 0.207 |
| Hg | 0.102 |

Experimental error is ±0.002

The results thus demonstrate that poly(2-vinyl pyridine-1-oxide) effectively chelates heavy metal ions and forms soluble complexes which are stable down to a pH of 2.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of chelating a heavy metal ion which comprises mixing an aqueous solution containing said ion with an aqueous solution of water soluble poly(2-vinyl pyridine-1-oxide), the concentration of the poly(2-vinyl pyridine-1-oxide) in the latter aqueous solution being at least 0.03% by weight, to form a water soluble polymer-metal complex which is stable in an acid medium down to a pH of about 2.

2. The method of claim 1 wherein the heavy metal ion is selected from the group consisting of mercury, lead, iron, cadmium, chromium, copper, cobalt, nickel, zinc, tin, silver, manganese, vanadium and titanium.

3. The method of claim 2 wherein the heavy metal ion is mercury.

4. The method of claim 2 wherein the heavy metal ion is lead.

* * * * *